(12) United States Patent
Hayama et al.

(10) Patent No.: US 11,754,194 B2
(45) Date of Patent: Sep. 12, 2023

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Toshinori Kanzaki, Tokyo (JP); Wataru Takahashi, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 8 days.

(21) Appl. No.: 17/599,520

(22) PCT Filed: Apr. 2, 2020

(86) PCT No.: PCT/JP2020/015179
§ 371 (c)(1),
(2) Date: Sep. 28, 2021

(87) PCT Pub. No.: WO2020/204134
PCT Pub. Date: Oct. 8, 2020

(65) Prior Publication Data
US 2022/0154838 A1    May 19, 2022

(30) Foreign Application Priority Data
Apr. 3, 2019    (JP) .................. 2019-071633

(51) Int. Cl.
*F16K 17/06* (2006.01)
*F16K 17/04* (2006.01)
*F04B 27/18* (2006.01)

(52) U.S. Cl.
CPC ............ *F16K 17/06* (2013.01); *F16K 17/048* (2013.01); *F04B 2027/1831* (2013.01)

(58) Field of Classification Search
None
See application file for complete search history.

(56) References Cited

U.S. PATENT DOCUMENTS 3,765,644 A    10/1973  Zeuner ............... F16K 31/0655
4,291,860 A     9/1981  Bauer ................ F16K 31/0655
(Continued)

FOREIGN PATENT DOCUMENTS

| CN | 2869383 | 2/2007 | ............. F04B 49/22 |
| CN | 102384056 | 3/2012 | ............. F04B 27/14 |

(Continued)

OTHER PUBLICATIONS

International Preliminary Report on Patentability issued in PCT International Patent Application Serial No. PCT/JP2020/015177, dated Oct. 14, 2021 with translation (6 pgs).

(Continued)

*Primary Examiner* — Robert K Arundale
*Assistant Examiner* — R. K. Arundale
(74) *Attorney, Agent, or Firm* — HAYES SOLOWAY P.C.

(57) ABSTRACT

A capacity control valve includes a valve housing provided with a suction fluid supply chamber to which a suction fluid of suction pressure Ps is supplied, and a control fluid supply chamber to which a control fluid of control pressure Pc is supplied, a CS valve formed by a CS valve element driven in the axial direction by a solenoid, and a CS valve seat provided in a communication passage between the control fluid supply chamber and the suction fluid supply chamber, the CS valve being connectable to and separable from the CS valve seat, and a pressure drive portion arranged in the control fluid supply chamber in a sealed manner and biasing the CS valve element in the opposite direction to the driving direction by the solenoid.

8 Claims, 7 Drawing Sheets

(56) References Cited

U.S. PATENT DOCUMENTS

| | | | | |
|---|---|---|---|---|
| 5,022,629 | A | 6/1991 | Tibbals | B05B 1/3053 |
| 5,076,538 | A | 12/1991 | Mohr | B60T 15/028 |
| 5,401,087 | A | 3/1995 | Goossens | F16J 15/56 |
| 5,503,184 | A | 4/1996 | Reinartz | B60T 8/367 |
| 6,217,292 | B1 | 4/2001 | Ota | F04B 27/1804 |
| 6,234,763 | B1 | 5/2001 | Ota et al. | 417/222.2 |
| 6,244,159 | B1 | 6/2001 | Kimura et al. | F01B 3/02 |
| 6,250,600 | B1 | 6/2001 | Kumagai | G05D 16/0619 |
| 6,350,106 | B1 | 2/2002 | Shimizu | F04B 27/1804 |
| 6,398,516 | B1 | 6/2002 | Kawaguchi et al. | 417/222.2 |
| 6,443,708 | B1 | 9/2002 | Hirota | F04B 27/1804 |
| 6,481,976 | B2 | 11/2002 | Kimura | F04B 27/1804 |
| 6,585,494 | B1 | 7/2003 | Suzuki | F25B 9/008 |
| 6,644,621 | B2 | 11/2003 | Ji | B60T 13/686 |
| 6,772,990 | B2 | 8/2004 | Sasaki et al. | F04B 49/00 |
| 6,893,215 | B2 | 5/2005 | Kuwabara et al. | F01D 25/26 |
| 6,976,665 | B2 | 12/2005 | Seitz | B60T 8/363 |
| 7,014,427 | B1 | 3/2006 | Hirota | 417/218 |
| 8,418,723 | B2 | 4/2013 | Tsuchiya | F16K 31/0655 |
| 8,550,427 | B2 | 10/2013 | Yoshida | B60T 8/363 |
| 9,334,978 | B2 | 5/2016 | Lappan | F04C 2/3442 |
| 9,581,149 | B2 | 2/2017 | Ota et al. | F04B 27/1804 |
| 10,316,975 | B2 | 6/2019 | Fangauer | F16K 1/38 |
| 10,781,804 | B2* | 9/2020 | Higashidozono | F04B 27/18 |
| 10,823,162 | B2 | 11/2020 | Kume et al. | F04B 27/18 |
| 11,215,293 | B2 | 1/2022 | Fukuda | F04B 53/10 |
| 11,480,166 | B2* | 10/2022 | Hayama | F04B 27/10 |
| 2002/0031432 | A1 | 3/2002 | Ota et al. | F04B 1/26 |
| 2002/0098091 | A1 | 7/2002 | Umemura | F04B 27/1804 |
| 2003/0019226 | A1 | 1/2003 | Hirota | F04B 27/1804 |
| 2004/0060604 | A1* | 4/2004 | Uemura | G05D 16/2024 137/595 |
| 2004/0091368 | A1* | 5/2004 | Kainuma | F04B 27/1804 417/222.2 |
| 2005/0287014 | A1* | 12/2005 | Umemura | F04B 27/1804 417/222.1 |
| 2006/0237552 | A1 | 10/2006 | Umemura | F16K 31/0655 |
| 2007/0164244 | A1 | 7/2007 | Kratzer | F16K 31/0658 |
| 2008/0175727 | A1 | 7/2008 | Umemura | F04B 27/1804 |
| 2011/0091334 | A1 | 4/2011 | Taguchi | F04B 27/1804 |
| 2012/0056113 | A1 | 3/2012 | Tano et al. | F16K 31/12 |
| 2013/0291963 | A1 | 11/2013 | Futakuchi et al. | B60H 1/00 |
| 2014/0369862 | A1 | 12/2014 | Ota et al. | F04B 27/1804 |
| 2015/0044065 | A1 | 2/2015 | Ota et al. | F04B 27/18 |
| 2015/0211502 | A1 | 7/2015 | Ota et al. | F04B 7/0076 |
| 2016/0186733 | A1 | 6/2016 | Sugamura et al. | F04B 27/1804 |
| 2019/0331249 | A1 | 10/2019 | Borja | F16K 1/44 |

FOREIGN PATENT DOCUMENTS

| | | | | |
|---|---|---|---|---|
| CN | 103671033 | | 3/2014 | F04B 39/08 |
| CN | 105736308 | | 7/2016 | F04B 39/00 |
| CN | 109416133 | | 3/2019 | F16K 31/06 |
| EP | 0255764 | | 7/1987 | F04B 1/28 |
| EP | 0945617 | | 9/1999 | F04B 27/18 |
| EP | 0980976 | | 2/2000 | F04B 27/18 |
| EP | 1091125 | | 4/2001 | F04B 27/18 |
| EP | 1098091 | | 5/2001 | F04B 27/18 |
| EP | 1052124 | | 11/2002 | B60H 1/32 |
| EP | 1279831 | | 1/2003 | F04B 27/18 |
| EP | 1375918 | | 1/2004 | F04B 27/18 |
| EP | 1512871 | | 3/2005 | F04B 27/18 |
| EP | 2952741 | | 12/2015 | F16K 31/06 |
| GB | 787961 | | 12/1957 | F04B 43/067 |
| JP | 7-27049 | | 1/1995 | F04B 24/10 |
| JP | 2000-87849 | | 3/2000 | F04B 27/14 |
| JP | 2000-161234 | | 6/2000 | F04B 49/00 |
| JP | 3242496 | | 10/2001 | F04B 27/14 |
| JP | 2002-70732 | | 3/2002 | F04B 27/14 |
| JP | 2002-201913 | | 7/2002 | F01D 11/00 |
| JP | 2003-322086 | | 11/2003 | F04B 49/00 |
| JP | 3581598 | | 7/2004 | F04B 29/10 |
| JP | 2006-17087 | | 1/2006 | F04B 27/14 |
| JP | 2006-52648 | | 2/2006 | F04B 27/14 |
| JP | 3783434 | | 3/2006 | F04B 27/14 |
| JP | 2011-94554 | | 5/2011 | F04B 27/14 |
| JP | 2014-80927 | | 5/2014 | F04B 27/14 |
| JP | 2014-126025 | | 7/2014 | F04B 27/14 |
| JP | 2015-1168 | | 1/2015 | F04B 27/14 |
| JP | 2015-34510 | | 2/2015 | F04B 27/14 |
| JP | 5983539 | | 8/2016 | F04B 27/18 |
| JP | 2017-31834 | | 2/2017 | F04B 27/18 |
| JP | 2018-3884 | | 1/2018 | F16K 31/06 |
| WO | WO2005095796 | | 10/2005 | F04B 27/14 |
| WO | WO2012/077439 | | 6/2012 | F04B 27/14 |
| WO | WO2015093502 | | 6/2015 | F04B 49/80 |
| WO | WO2017057160 | | 4/2017 | F04B 27/18 |

OTHER PUBLICATIONS

International Search Report and Written Opinion issued in PCT International Patent Application Serial No. PCT/JP2020/015177, dated Jun. 23, 2020 with translation (14 pgs).
International Search Report and Written Opinion issued in PCT International Patent Application Serial No. PCT/JP2020/015179, dated Jun. 9, 2020 with translation (11 pgs).
International Preliminary Report on Patentability issued in PCT International Patent Application Serial No. PCT/JP2020/015179, dated Oct. 26, 2021 with translation (5 pgs).
International Search Report and Written Opinion issued in PCT International Patent Application Serial No. PCT/JP2020/017169, dated Jun. 16, 2020 with translation (12 pgs).
International Preliminary Report on Patentability issued in PCT International Patent Application Serial No. PCT/JP2020/017169, dated Nov. 4, 2021 with translation (5 pgs).
International Search Report and Written Opinion issued in PCT International Patent Application Serial No. PCT/JP2020/017168, dated Jun. 16, 2020 with translation (14 pgs).
International Preliminary Report on Patentability issued in PCT International Patent Application Serial No. PCT/JP2020/017168, dated Nov. 4, 2021 with translation (6 pgs).
International Search Report and Written Opinion issued in PCT International Patent Application Serial No. PCT/JP2020/015176, dated Jun. 23, 2020 with translation (12 pgs).
International Preliminary Report on Patentability issued in PCT International Patent Application Serial No. PCT/JP2020/015176, dated Oct. 14, 2021 with translation (5 pgs).
International Search Report and Written Opinion issued in PCT International Patent Application Serial No. PCT/JP2020/015180, dated Jun. 9, 2020 with translation (11 pgs).
International Preliminary Report on Patentability issued in PCT International Patent Application Serial No. PCT/JP2020/015180, dated Oct. 14, 2021 with translation (5 pgs).
Chinese Official Action issued in related Chinese Application Serial No. 202080026556.1, dated Oct. 9, 2022, 9 pages.
Chinese Official Action issued in related Chinese Application Serial No. 202080026542.X, dated Oct. 8, 2022, 9 pages.
Chinese Official Action issued in related Chinese Application Serial No. 202080026419.8, dated Sep. 29, 2022, 10 pages.
Chinese Official Action issued in related Chinese Application Serial No. 202080026977.4, dated Oct. 21, 2022, 11 pages.
European Search Report issued in related European Patent Application Serial No. 20783904.4, dated Oct. 19, 2022, 7 pages.
European Search Report issued in related European Patent Application Serial No. 20795975.0, dated Oct. 19, 2022, 7 pages.
European Search Report issued in related European Patent Application Serial No. 20795023, dated Dec. 5, 2022, 9 pages.
European Search Report issued in related European Patent Application Serial No. 20782343, dated Oct. 18, 2022, 8 pages.
European Search Report issued in related European Patent Application Serial No. 20782596, dated Nov. 2, 2022, 9 pages.
European Search Report issued in related European Patent Application Serial No. 20785209, dated Oct. 27, 2022, 8 pages.
U.S. Appl. No. 17/599,520, filed Sep. 28, 2020, Hayama et al.
U.S. Appl. No. 17/600,529, filed Sep. 30, 2020, Hayama et al.
U.S. Appl. No. 17/599,474, filed Sep. 28, 2020, Hayama et al.
U.S. Appl. No. 17/599,467, filed Sep. 28, 2020, Hayama et al.

(56) References Cited

OTHER PUBLICATIONS

U.S. Appl. No. 17/603,291, filed Oct. 12, 2021, Fukudome et al.
U.S. Appl. No. 17/603,284, filed Oct. 12, 2021, Hayama et al.
Official Action issued in related U.S. Appl. No. 17/599,474, dated Mar. 2, 2023, 11 pages.
Official Action issued in related U.S. Appl. No. 17/599,467, dated Jan. 24, 2023, 11 pages.
Chinese Official Action issued in related application serial No. 202080026542.X, dated Mar. 16, 2023, 11 pages with translation.
Chinese Official Action issued in related application serial No. 202080026977.4, dated Apr. 20, 2023, 12 pages with translation.
Korean Official Action issued in related application serial No. 10-2021-7036305, dated Mar. 15, 2023, 8 pages with translation.
Official Action issued in related U.S. Appl. No. 17/603,284, dated May 3, 2023, 10 pages.
Official Action issued in related U.S. Appl. No. 17/599,467, dated May 10, 2023, 12 pages.
Official Action issued in related U.S. Appl. No. 17/603,291, dated May 8, 2023, 9 pages.

* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile in accordance with pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing suction pressure Ps of a suction chamber that suctions the fluid, discharge pressure Pd of a discharge chamber that discharges the fluid pressurized by the pistons, and control pressure Pc of the control chamber that houses the swash plate, with using a capacity control valve to be driven to open and close by electromagnetic force.

At the time of continuously driving the variable displacement compressor, the capacity control valve performs normal control in which energization is controlled by a control computer, a valve element is moved in the axial direction by electromagnetic force generated in a solenoid, and a CS valve provided between a control port through which a control fluid of the control pressure Pc passes and a suction port through which a suction fluid of the suction pressure Ps passes is opened and closed to adjust the control pressure Pc of the control chamber of the variable displacement compressor.

For example, a capacity control valve shown in Patent Citation 1 is mainly formed by a valve housing including a control fluid supply chamber to which a control fluid is supplied and a suction fluid supply chamber to which a suction fluid is supplied, and a CS valve capable of opening and closing a communication passage between the control fluid supply chamber and the suction fluid supply chamber. By opening and closing the communication passage by the CS valve, control pressure Pc of the control fluid supply chamber is adjusted. In this capacity control valve, a pressure sensitive body extendable and contractible in accordance with suction pressure Ps is arranged in the suction fluid supply chamber, and the pressure sensitive body biases a CS valve element of the CS valve which moves in the valve closing direction in the valve opening direction. According to this, at the time of driving a solenoid, the pressure sensitive body is contracted in a case where the suction pressure Ps is high, and the pressure sensitive body is extended in a case where the suction pressure Ps is low. Thus, it is possible to change an opening degree of the CS valve in accordance with the suction pressure Ps and finely adjust the control pressure Pc.

CITATION LIST

Patent Literature

Patent Citation 1: JP 5983539 B2 (PAGE 8, FIG. 3)

SUMMARY OF INVENTION

Technical Problem

In the air conditioning system as described above, when an operation of changing an output of the air conditioning system is performed, an output of an expansion valve is increased or decreased, and a flow rate of the suction fluid supplied to a suction chamber of a variable displacement compressor and suction fluid pressure are also changed. However, in the capacity control valve of Patent Citation 1, the pressure sensitive body is extendable and contractible in accordance with only the suction pressure Ps. Thus, when an operation of a radical output change of the air conditioning system is performed, there is a possibility that it takes time to adjust the variable displacement compressor to target control pressure Pc.

The present invention is achieved focusing on such a problem, and an object thereof is to provide a capacity control valve having high responsiveness even upon a radical output change.

Solution to Problem

In order to solve the foregoing problem, a capacity control valve according to the present invention is a capacity control valve including: a valve housing provided with a suction fluid supply chamber to which a suction fluid of suction pressure is supplied, and a control fluid supply chamber to which a control fluid of control pressure is supplied; a CS valve formed by a CS valve element driven in an axial direction by a solenoid, and a CS valve seat provided in a communication passage between the control fluid supply chamber and the suction fluid supply chamber, the CS valve being connectable to and separable from the CS valve seat; and a pressure drive portion arranged in the control fluid supply chamber in a sealed manner and biasing the CS valve element in an opposite direction to a driving direction of the solenoid, wherein the control fluid is introduced on a first side of the pressure drive portion, and the suction fluid is introduced on a second side of the pressure drive portion, the first side and the second side being opposed to each other through the pressure drive portion in the axial direction. According to the forgoing feature of the present invention, the control fluid is applied on the outside which is the first side of the pressure drive portion, and the suction pressure is applied on the inside which is the second side. Thus, it is possible to adjust an opening degree of the CS valve by a pressure difference between the suction pressure of the suction fluid and the control pressure of the control fluid, and hence make adjustment to target control pressure Pc with high precision. Therefore, responsiveness is high even to a radical output change, and it is possible to promptly control a variable displacement compressor to the target control pressure Pc.

It may be preferable that an effective pressure receiving area of the pressure drive portion is larger than an area of a valve opening of the CS valve seat. According to this preferable configuration, at the time of driving the solenoid, the control pressure is applied in the direction in which the pressure drive portion is against the driving direction thereof, for example, in the direction of contracting in a compression type pressure drive portion. Thus, it is possible to reliably ease the suction pressure by the control pressure.

It may be preferable that the capacity control valve further includes a retaining member that retains the pressure drive portion, wherein the retaining member is provided with a supply port communicating with an inside of the pressure drive portion, the supply port being directed in the axial direction. According to this preferable configuration, the suction fluid is supplied from the supply port in the axial direction. Thus, the suction pressure of the suction fluid is easily transmitted to the pressure drive portion.

It may be preferable that the capacity control valve further includes a return spring that is provided separately from the pressure drive portion and biases the CS valve element in the opposite direction to the driving direction of the solenoid, wherein the CS valve element and the pressure drive portion are out of contact upon a non-driving state of the solenoid. According to this preferable configuration, the valve element and the pressure drive portion are out of contact upon a non-driving state of the solenoid. Thus, it is possible to smoothly operate the valve element at the time of driving the solenoid, and ensure a vibration suspending property by the return spring at the time of a non-contact state of the valve element and the pressure drive portion.

It may be preferable that the pressure drive portion includes a spring that biases the CS valve element in the opposite direction to the driving direction of the solenoid, and the spring may have a spring constant higher than a spring constant of the return spring. According to this preferable configuration, in a state where the CS valve element is in contact with the pressure drive portion, bias force of the spring having a higher spring constant than the return spring is dominantly applied to the CS valve element. Thus, it is possible to increase control width of an electric current applied to the solenoid to finely make adjustment of the opening degree of the CS valve.

DESCRIPTION OF EMBODIMENTS

Modes for carrying out a capacity control valve according to the present invention will be described below based on embodiments.

First Embodiment

A capacity control valve according to a first embodiment of the present invention will be described with reference to FIGS. 1 to 6. Hereinafter, description will be given with the left and right sides seen from the front side of FIG. 1 being the left and right sides of the capacity control valve.

A capacity control valve V of the present invention is assembled into a variable displacement compressor (not shown) used for an air conditioning system of an automobile, etc. By variably controlling pressure of a working fluid (hereinafter, simply referred to as the "fluid") serving as a coolant, a discharge amount of the variable displacement compressor is controlled and the air conditioning system is adjusted to have a target cooling ability.

First, the variable displacement compressor will be described. The variable displacement compressor has a casing including a discharge chamber, a suction chamber, a control chamber, and plural cylinders. A communication passage providing direct communication between the discharge chamber and the control chamber is provided in the variable displacement compressor. A fixed orifice 9 is provided in this communication passage (see FIG. 1).

The variable displacement compressor also includes a rotating shaft to be driven and rotated by an engine (not shown) installed outside the casing, a swash plate coupled to the rotating shaft in an eccentric state by a hinge mechanism in the control chamber, and plural pistons coupled to the swash plate and fitted reciprocatably in the respective cylinders. With using the capacity control valve V to be driven to open and close by electromagnetic force, a tilt angle of the swash plate is continuously changed by appropriately controlling pressure in the control chamber while utilizing suction pressure Ps of the suction chamber that suctions the fluid, discharge pressure Pd of the discharge chamber that discharges the fluid pressurized by the pistons, and control pressure Pc of the control chamber that houses the swash plate. Thereby, a stroke amount of the pistons is changed to control a discharge amount of the fluid.

Figure 1:
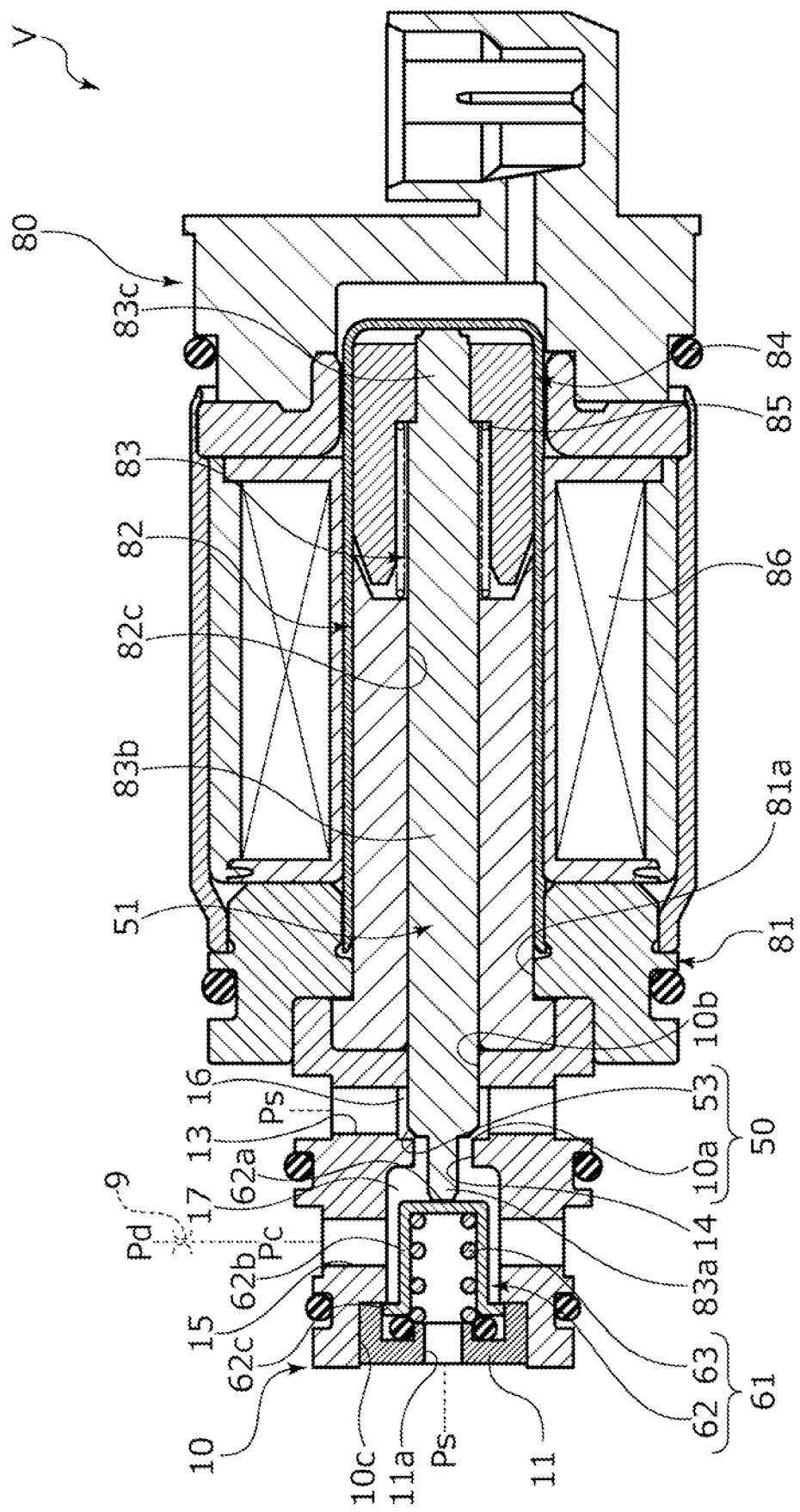
FIG. 1 is a sectional view showing a structure of a capacity control valve according to a first embodiment of the present invention.

As shown in FIG. 1, the capacity control valve V assembled into the variable displacement compressor adjusts an electric current energized in a coil 86 forming a solenoid 80 and performs open/close control of a CS valve 50 in the capacity control valve V, that is, the valve that opens and closes communication between a control port and a suction port, and by operating a pressure sensitive body 61 serving as a pressure drive portion and controlling the fluid flowing out to the suction chamber from the control chamber, the control pressure Pc in the control chamber is variably controlled. A discharge fluid of the discharge pressure Pd of the discharge chamber is always supplied to the control chamber via the fixed orifice 9, and the control pressure Pc in the control chamber can be increased by closing the CS valve 50 in the capacity control valve V.

Next, a structure of the capacity control valve V will be described. As shown in FIG. 1, the capacity control valve V is mainly formed by a valve housing 10 made of a metal material or a resin material, a CS valve element 51 arranged reciprocatably in the axial direction, the pressure sensitive body 61 arranged in a control fluid supply chamber 17 which is provided in the valve housing 10, the pressure sensitive body that applies bias force to the CS valve element 51 in the axial direction, and the solenoid 80 connected to the valve housing 10, the solenoid that applies drive force to the CS valve element 51.

In the valve housing 10, a Ps port 13 serving as a suction port which communicates with the suction chamber of the variable displacement compressor, a suction fluid supply chamber 16 to which a suction fluid is supplied from the Ps port 13, a Pc port 15 serving as a control port which communicates with the control chamber of the variable displacement compressor, the control fluid supply chamber 17 to which a control fluid is supplied from the Pc port 15, and a communication passage 14 providing communication between the suction fluid supply chamber 16 and the control fluid supply chamber 17 are formed.

A hole portion 10c passing through in the axial direction is formed in an axially left end portion of the valve housing 10, and the hole portion 10c is closed by a lid member 11. Between this valve housing 10 and the lid member 11, the pressure sensitive body 61 is nipped and retained. That is, the lid member 11 functions as a retaining member that retains the pressure sensitive body 61. A supply port 11a passing through in the axial direction is formed in the lid member 11, and the supply port 11a communicates with the suction chamber. The pressure sensitive body 61 may be fixed to the lid member 11 or the valve housing 10 by bonding or welding.

A guide hole 10b passing through in the axial direction is formed in an axially right end portion of the valve housing 10. An axially left end portion of a drive rod 83 to be described later is inserted through the guide hole, and the guide hole functions as a guide when the drive rod 83 is driven in the axial direction.

The solenoid 80 is mainly formed by a casing 81 having an opening portion 81a which is open on the axially left side, a substantially cylindrical center post 82 inserted into the opening portion 81a of the casing 81 from the axially left side and fixed on the radially inner side of the casing 81, the drive rod 83 inserted through an insertion hole 82c of the center post 82 reciprocatably in the axial direction, a movable iron core 84 to which an axially right end portion 83c of the drive rod 83 is inserted and fixed, a coil spring 85 provided between the center post 82 and the movable iron core 84, the coil spring serving as a return spring that biases the movable iron core 84 to the axially right side which is the valve opening direction of the CS valve 50, and the excitation coil 86 wound on the outside of the center post 82 via a bobbin.

The drive rod 83 is formed in a stepped columnar shape, and also serves as the CS valve element 51. From the axially left side, an axially left end portion 83a serving as an axial portion having a small diameter, a large diameter portion 83b having a larger diameter than the axially left end portion 83a, and the axially right end portion 83c having a smaller diameter than the large diameter portion 83b are formed. An axially left end outer diameter portion 53 of the large diameter portion 83b is connectable to and separable from a CS valve seat 10a. That is, the CS valve 50 is formed by the axially left end outer diameter portion 53 of the CS valve element 51 and the CS valve seat 10a, and by connecting and separating the CS valve element 51 to and from the CS valve seat 10a, the CS valve 50 is opened and closed. In a state where the solenoid 80 is turned off, the CS valve element 51 is biased in the valve opening direction of the CS valve 50 by the coil spring 85.

The pressure sensitive body 61 is mainly formed by a film body 62 made of a flexible metal material or a flexible resin material, the film body being extendable and contractible in the axial direction, and a spring 63 arranged inside the film body 62. The film body 62 includes a pressure receiving portion 62a which is orthogonal in the axial direction, a side wall portion 62b extending on the axially left side from a peripheral edge of the pressure receiving portion 62a, and a flange portion 62c extending in the radially outward direction from an axially left end of the side wall portion 62b, and has a hat-shaped section. An O ring is arranged between the flange portion 62c and the lid member 11 and attached to the valve housing 10 in a substantially sealed manner. The supply port 11a of the lid member 11 communicates with the inside 61s serving as a space on the other side of this film body 62, and the suction fluid can flow into the inside from the supply port 11a. That is, the suction fluid exists on the inside of the film body 62, i.e., the inside 61s of the pressure sensitive body 61 and the control fluid in the control fluid supply chamber 17 exists on the outside serving as a space on one side of the film body 62. The spring 63 is a spring having a higher spring constant K63 than a spring constant K85 of the coil spring 85 (K63>K85), and biases to press the pressure receiving portion 62a of the film body 62 to the axially right side.

Figure 2:
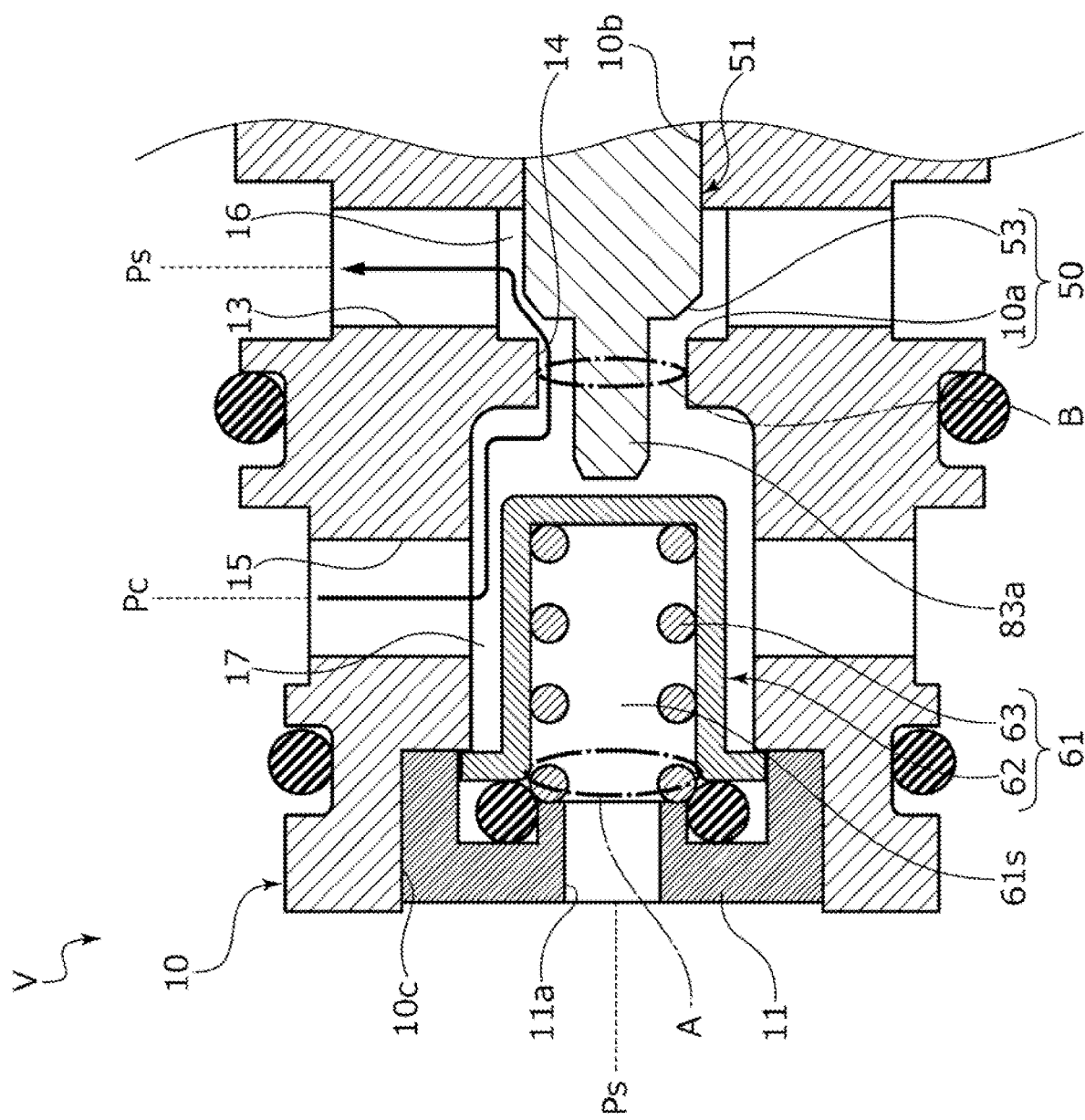
FIG. 2 is a sectional view showing a state where a CS valve is opened in a non-energized state of the capacity control valve according to the first embodiment of the present invention.

As shown in FIG. 2, an effective pressure receiving area A of the pressure sensitive body 61 is formed to be larger than a sectional area B of the communication passage 14 serving as a valve opening of the CS valve seat 10a (A>B).

Next, actions of the capacity control valve V, mainly actions of opening and closing the CS valve 50 will be described.

First, a non-energized state of the capacity control valve V will be described. As shown in FIGS. 1 and 2, in the capacity control valve V, in a non-energized state, by pressing the movable iron core 84 to the axially right side by bias force of the coil spring 85, the CS valve element 51 is separated from the CS valve seat 10a, and the CS valve 50 is opened.

At this time, to the CS valve element 51, the bias force $F_{sp1}$ of the coil spring 85 and force $F_{P1}$ by pressure of the fluid to an axially left end surface of the CS valve element 51 are applied to the axially right side, and force $F_{P2}$ by pressure of the fluid to an axially right end surface of the CS valve element 51 is applied to the axially left side. That is, given that the right side is the positive side, force $F_{rod}=F_{sp1}+F_{P1}-F_{P2}$ is applied to the CS valve element 51. At the time of opening the CS valve 50, the force $F_{P1}$ by the pressure of the fluid to the axially left end surface of the CS valve element 51 is force by pressure of the fluid in the suction fluid supply chamber 16, and the force $F_{P2}$ by the pressure of the fluid to the axially right end surface of the CS valve element 51 is force by pressure of the fluid running round from the suction fluid supply chamber 16 to the back surface side of the drive rod 83 via a gap between an inner peripheral surface of the guide hole 10b of the valve housing 10 and an outer peripheral surface of the CS valve element 51. The pressure in the suction fluid supply chamber 16 is based on the control pressure Pc and the suction pressure Ps which are lower than the discharge pressure Pd. Thus, an influence of the forces $F_{P1}$, $F_{P2}$ by the pressure to the CS valve element 51 is small.

Figure 3:
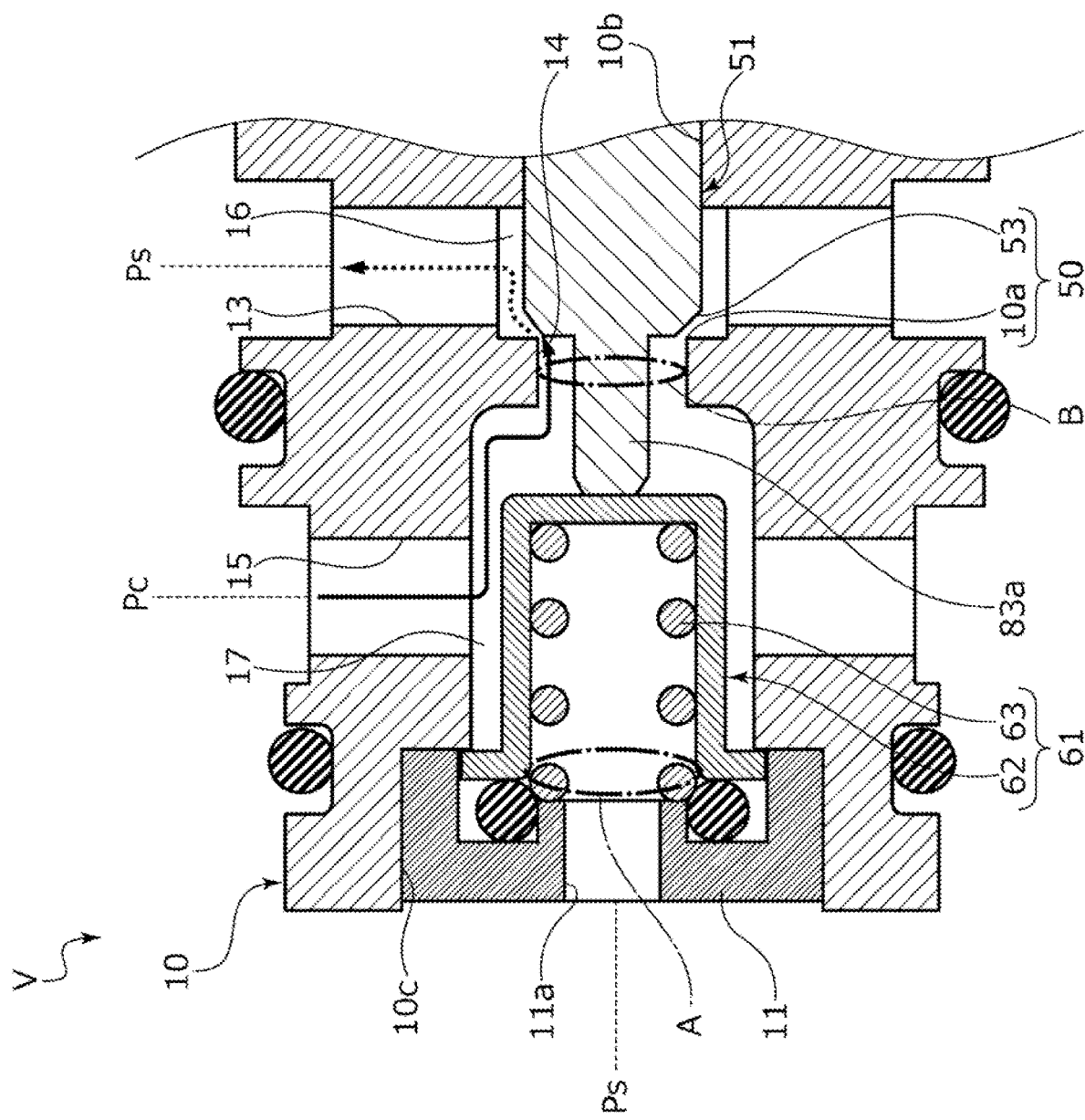
FIG. 3 is a sectional view showing a state where a drive rod is in contact with a pressure sensitive body in an energized state of the capacity control valve according to the first embodiment of the present invention.

Next, an energized state of the capacity control valve V will be described. As shown in FIGS. 1 and 3, in the capacity control valve V, in an energized state, that is, at the time of normal control, at the time of so-called duty control, when electromagnetic force $F_{sol}$ generated by applying an electric current to the solenoid 80 exceeds the force $F_{rod}$ (i.e., $F_{sol}$>$F_{rod}$), by pulling the movable iron core 84 to the center post 82 side, that is, to the axially left side, and moving the CS valve element 51 fixed to the movable iron core 84 to the axially left side together, the axially left end portion 83a is brought into contact with the pressure sensitive body 61.

Before the axially left end portion 83a is brought into contact with the pressure sensitive body 61, to the CS valve element 51, the electromagnetic force $F_{sol}$ is applied on the axially left side, and the force $F_{rod}$ is applied on the axially right side. That is, given that the right side is the positive side, force $F_{rod}$-$F_{sol}$ is applied to the CS valve element 51. After the axially left end portion 83a is brought into contact with the pressure sensitive body 61, force $F_{bel}$ is further added to the axially right side from the pressure sensitive body 61. The force $F_{bel}$ applied from the pressure sensitive body 61 is force obtained by subtracting the force $F_{Pc-Ps}$ based on a pressure difference between the control pressure Pc and the suction pressure Ps from bias force $F_{sp2}$ of the spring 63, and given that the right side is the positive side, $F_{bel}$=$F_{sp2}$-$F_{Pc-Ps}$ is applied. At the time of considering bias force of the film body 62 itself, the bias force of the film body 62 itself may be added to the bias force of the spring 63 itself.

Figure 4:
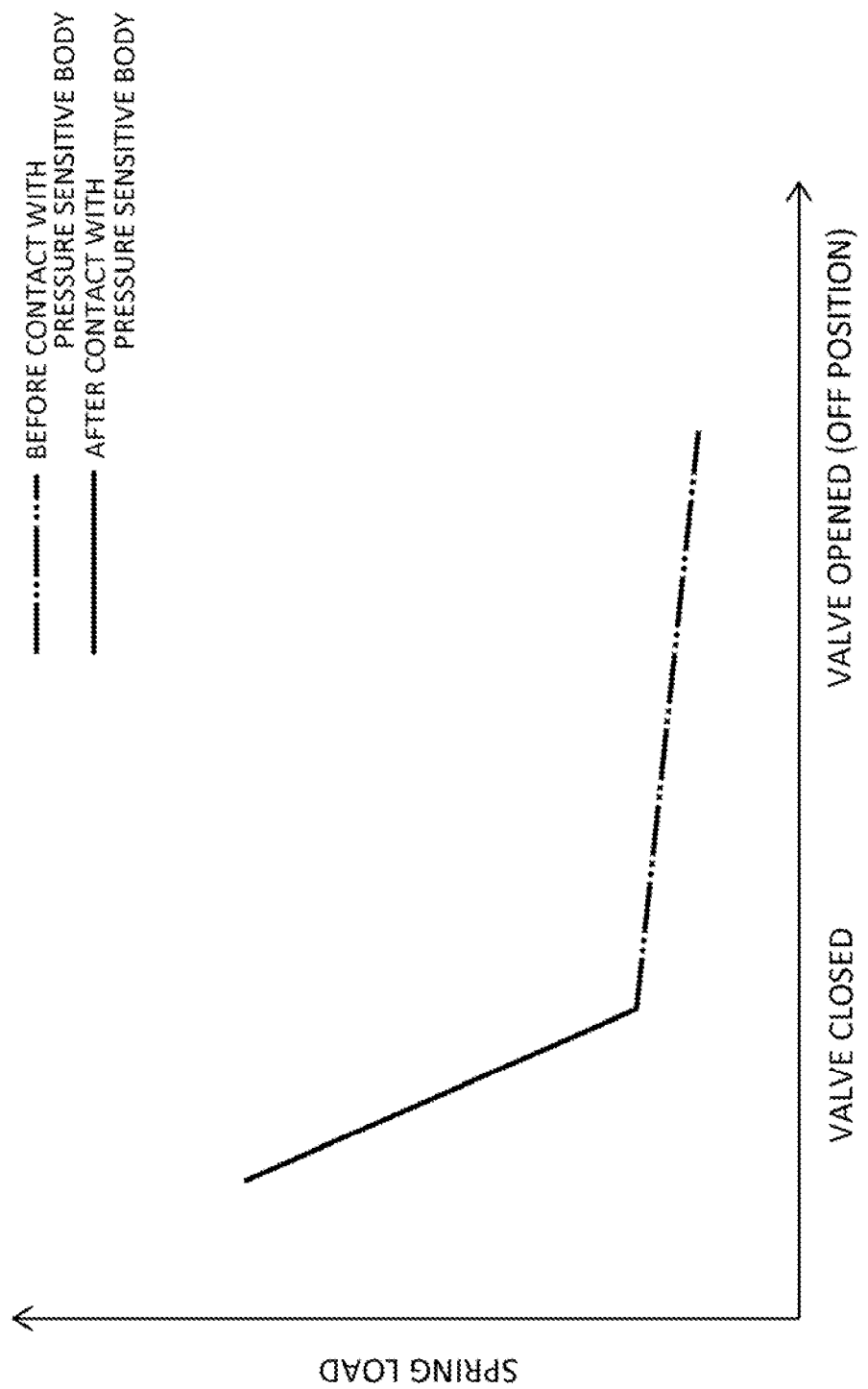
FIG. 4 is an illustrative view of bias force applied to the drive rod at the time of opening and closing the CS valve in the first embodiment of the present invention.

With reference to FIG. 4, to the CS valve element 51, in a non-energized state of the capacity control valve V, the bias force $F_{sp1}$ of the coil spring 85 is applied to the axially right side, and the drive rod 83 is pressed to the right side. Thus, a vibration suspending property of the drive rod 83 is ensured. In an energized state of the capacity control valve V, before the axially left end portion 83a of the drive rod 83 is brought into contact with the pressure sensitive body 61, it is possible to smoothly operate the drive rod 83. After the axially left end portion 83a of the drive rod 83 is brought into contact with the pressure sensitive body 61, the bias force $F_{sp2}$ of the spring 63 of the pressure sensitive body 61 having a higher spring constant than the coil spring 85 is dominantly applied to the drive rod 83. Thus, control width of an electric current applied to the solenoid 80 is increased and it is possible to finely make adjustment of an opening degree of the CS valve 50.

Specifically, in a state where the axially left end portion 83a of the drive rod 83 and the pressure sensitive body 61 are in contact with each other, a high spring load is applied. Thus, a stroke of the drive rod 83 per unit applied electric current is shortened, and the opening degree of the CS valve 50 is more easily finely adjusted.

Next, a change in the control pressure and the suction pressure in a state where a predetermined electric current is applied to the solenoid 80, that is, in a state where predetermined electromagnetic force $F_{sol}$1 is generated in the solenoid 80 will be described. Hereinafter, a mode when an operation of increasing an output of the air conditioning system is performed, an output of an expansion valve of the air conditioning system is increased, and a flow rate of the suction fluid supplied to the suction chamber of the variable displacement compressor and the suction pressure Ps are increased will be illustrated.

Figure 5:
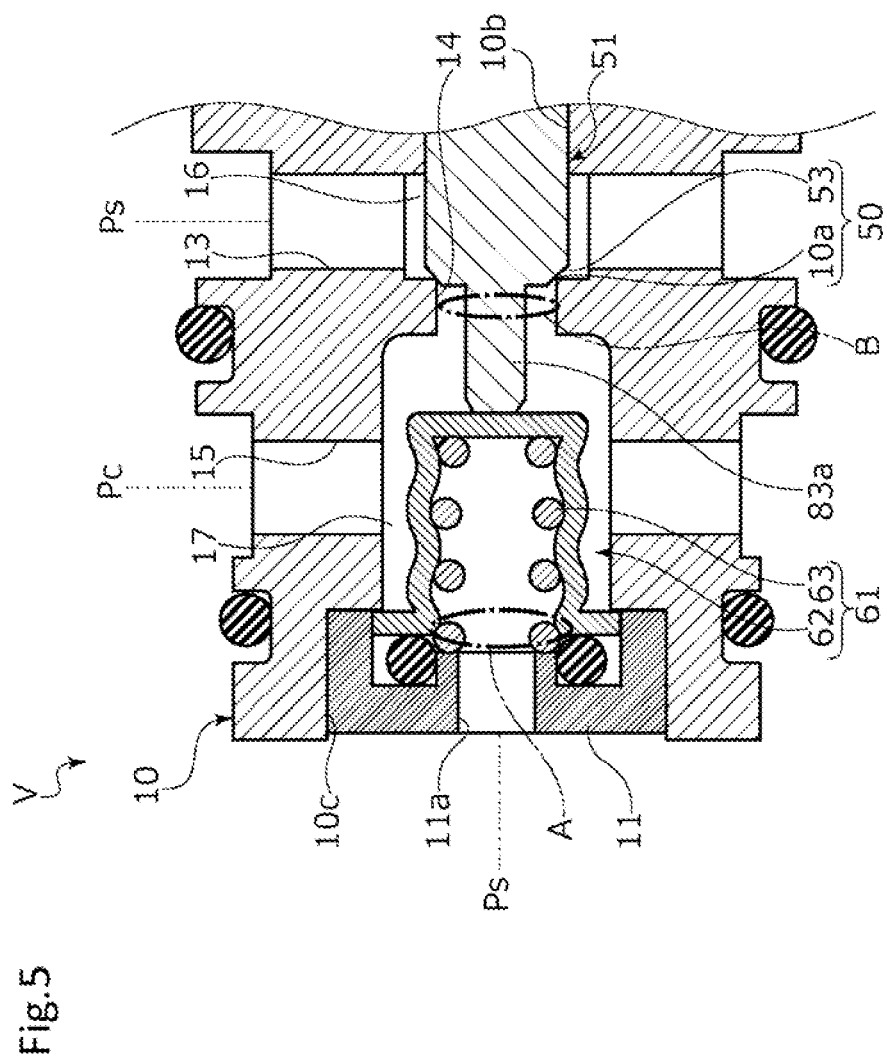
FIG. 5 is an illustrative view showing a case where a pressure difference between suction pressure and control pressure is large in the capacity control valve according to the first embodiment of the present invention.

As shown in FIG. 5, in a state where the predetermined electromagnetic force $F_{sol}$1 is generated in the solenoid 80 and the CS valve 50 is closed, and in a case where an increase in the suction pressure Ps is small, the pressure difference between the suction pressure Ps in the pressure sensitive body 61 and the control pressure Pc in the control fluid supply chamber 17 is large. Therefore, the pressure sensitive body 61 is more easily contracted by the control pressure Pc in the control fluid supply chamber 17, the CS valve element 51 is seated on the CS valve seat 10a of the valve housing 10, and a closed state of the CS valve 50 is maintained. At the time of closing the CS valve 50, the force $F_{P1}$ by the pressure of the fluid to the axially left end surface of the CS valve element 51 is force by the control pressure Pc of the control fluid of the Pc port 15.

Figure 6:
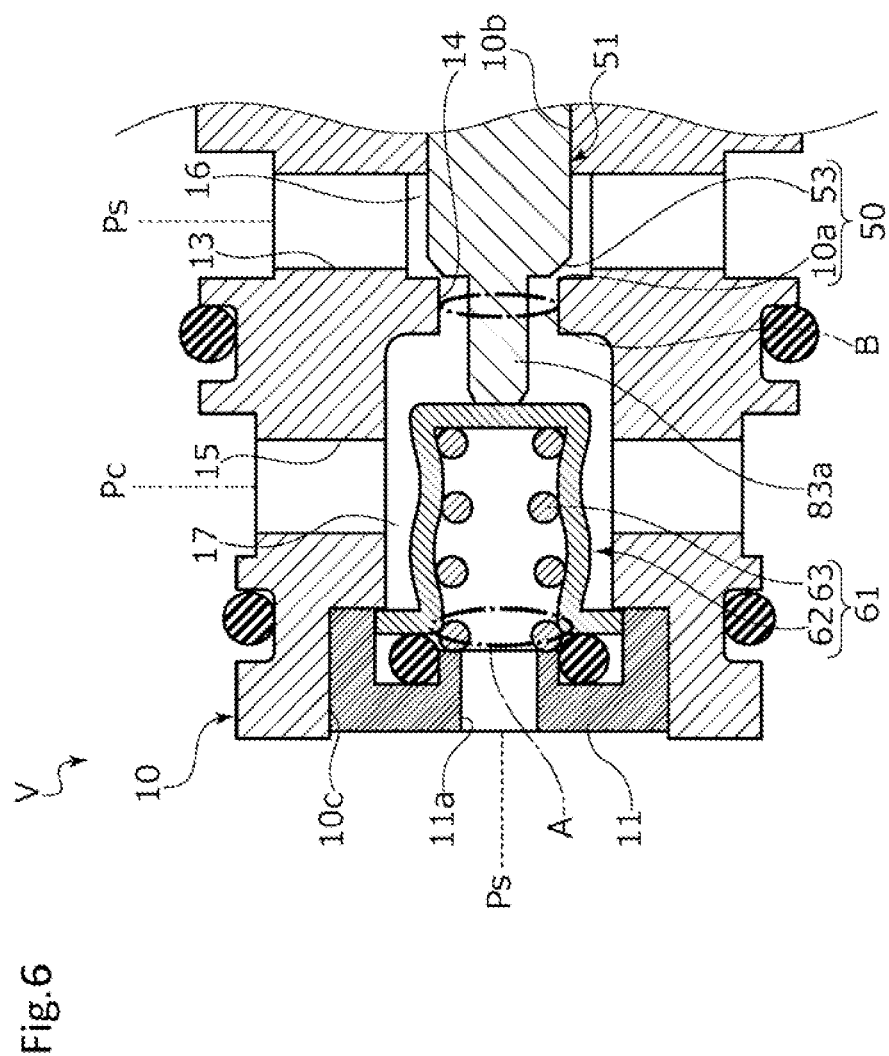
FIG. 6 is an illustrative view showing a case where the pressure difference between the suction pressure and the control pressure is small in the capacity control valve according to the first embodiment of the present invention.

Meanwhile, as shown in FIG. 6, in a state where the predetermined electromagnetic force $F_{sol}$1 is generated in the solenoid 80 and the CS valve 50 is closed, and in a case where the increase in the suction pressure Ps is large, the pressure difference between the suction pressure Ps in the pressure sensitive body 61 and the control pressure Pc in the control fluid supply chamber 17 is small. Therefore, the pressure sensitive body 61 is less easily contracted by the control pressure Pc in the control fluid supply chamber 17 than the state of FIG. 5, the CS valve element 51 is separated from the CS valve seat 10a of the valve housing 10, and the CS valve 50 is slightly opened.

In such a way, the suction pressure Ps is applied on the inside of the pressure sensitive body 61, and the control pressure Pc is applied on the outside of the pressure sensitive body 61. Thus, even when the output of the expansion valve of the air conditioning system is increased and the suction pressure Ps of the suction fluid supplied to the suction chamber of the variable displacement compressor is radically increased, the pressure sensitive body 61 can utilize the pressure difference between the control pressure Pc of the control fluid and the suction pressure Ps of the suction fluid, and adjust the opening degree of the CS valve 50. Therefore, responsiveness is high even to a radical output change, and it is possible to promptly control the variable displacement compressor to target control pressure Pc.

The effective pressure receiving area A of the pressure sensitive body 61 is formed to be larger than the sectional area B of the communication passage 14. Thus, at the time of driving the solenoid 80, the control pressure Pc is applied in the direction in which the pressure sensitive body 61 is contracted, and it is possible to reliably ease the suction pressure Ps by the control pressure Pc.

The supply port 11a passing through in the axial direction is formed in the lid member 11, and the suction fluid is directed in the axial direction and supplied from the supply port 11a into the pressure sensitive body 61. Thus, it is possible to immediately transmit the suction pressure Ps of the suction fluid to the pressure receiving portion 62a of the pressure sensitive body 61.

The CS valve seat 10a and the guide hole 10b are integrally formed in the valve housing 10. Thus, it is possible to enhance precision of an action of the CS valve element 51.

Second Embodiment

A capacity control valve according to a second embodiment of the present invention will be described with reference to FIG. 7. Duplicated description for the same configurations as the first embodiment is omitted.

As shown in FIG. 7, in the present embodiment, a CS valve 150 is formed by a projecting portion 153 projecting in the radially outward direction from the vicinity of an axially left end portion 831a of a drive rod 831, and a CS valve seat 110a formed in an inner diameter portion in an opening portion on the axially left side of a communication passage 14 of a valve housing 10. That is, the drive rod 831 also serves as a CS valve element 151, and the CS valve 150 is formed by the projecting portion 153 of the CS valve element 151 and the CS valve seat 110a. The projecting portion 153 of the CS valve element 151 is arranged in a control fluid supply chamber 17. By connecting and separating an axially right side surface of the projecting portion 153 to and from the CS valve seat 110a, the CS valve 150 is opened and closed. The drive rod 831 is moved to the axially right side by driving a solenoid. The axially left end portion 831a of the drive rod 831 is connected to a pressure sensitive body 611.

Although not shown, a coil spring serving as a return spring of the present embodiment is arranged to bias the drive rod 831 to the axially left side which is the valve opening direction of the CS valve 150. That is, although the structures are different, both the capacity control valves V of the first and second embodiments are normally-opened valves. Therefore, in a non-energized state of the capacity control valve V, by pressing a movable iron core 84 to the axially left side by bias force of the coil spring, the projecting portion 153 of the CS valve element 151 is separated from the CS valve seat 110a, and the CS valve 150 is opened. At this time, regarding the drive rod 831, in a case where a pressure difference between suction pressure Ps of the pressure sensitive body 611 and control pressure Pc in the control fluid supply chamber 17 is large, bias force of the pressure sensitive body 611 is hardly applied to the drive rod 831.

Figure 7A:
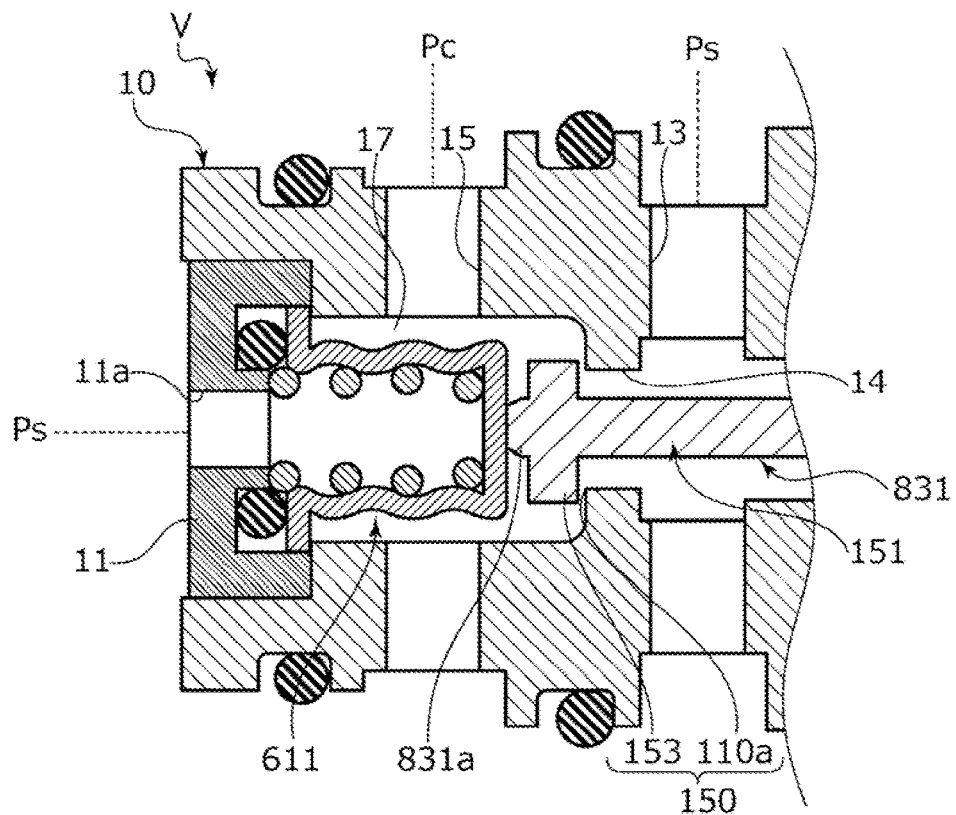
FIG. 7A is an illustrative view showing a case where a pressure difference between suction pressure and control pressure is large in a capacity control valve according to a second embodiment of the present invention.

As shown in FIG. 7A, in an energized state of the capacity control valve V, in a case where the pressure difference between the suction pressure Ps of the pressure sensitive body 611 and the control pressure Pc in the control fluid supply chamber 17 is large, the pressure sensitive body 611 is contracted. Thus, the bias force of the pressure sensitive body 611 is applied in the direction in which the drive rod 831 is pulled to the axially left side, the projecting portion 153 of the CS valve element 151 is separated from the CS valve seat 110a, and the CS valve 150 is slightly opened.

Figure 7B:
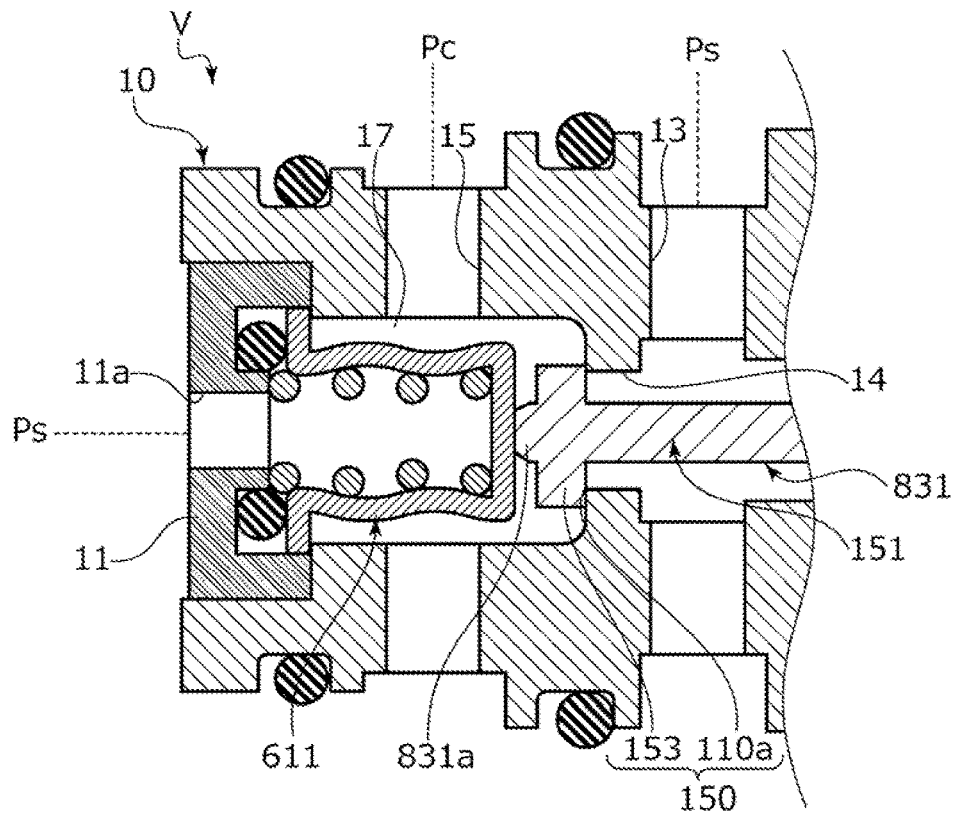
FIG. 7B is an illustrative view showing a case where the pressure difference between the suction pressure and the control pressure is small in the same capacity control valve.

Meanwhile, as shown in FIG. 7B, in an energized state of the capacity control valve V, in a case where the pressure difference between the suction pressure Ps of the pressure sensitive body 611 and the control pressure Pc in the control fluid supply chamber 17 is small, the pressure sensitive body 611 is extended. Thus, the bias force of the pressure sensitive body 611 is applied in the direction in which the drive rod 831 is pushed out to the axially right side, the projecting portion 153 of the CS valve element 151 is seated on the CS valve seat 110a, and the CS valve 150 is closed.

By forming in such a manner, the capacity control valve can be effective for a variable displacement compressor in which the higher the control pressure Pc in a control chamber is, the more a stroke amount of pistons is increased, and the lower the control pressure Pc in the control chamber is, the more the stroke amount of the pistons is decreased.

The embodiments of the present invention are described above with the drawings. However, specific configurations are not limited to these embodiments but the present invention includes changes and additions within the range not departing from the scope of the present invention.

For example, the above embodiments describe the mode that the CS valve element also serves as the drive rod arranged to pass through the coil 86 of the solenoid 80. However, the present invention is not limited to this but the CS valve element may be formed separately from the drive rod and formed reciprocatably in the axial direction together with the drive rod.

The above embodiments describe that the CS valve seat and the guide hole are integrally formed on the inner peripheral surface of the valve housing. However, the present invention is not limited to this but a valve housing having a CS valve seat and a valve housing having a guide hole may be separately provided.

A guide portion is not limited to be formed in the valve housing but may be formed in part of the insertion hole 82c of the center post 82, for example.

REFERENCE SIGNS LIST

10 Valve housing
10a CS valve seat
11 Lid member
11a Supply port
13 Ps port
14 Communication passage (valve opening)
15 Pc port
16 Suction fluid supply chamber
17 Control fluid supply chamber
50 CS valve
51 CS valve element
61 Pressure sensitive body (pressure drive portion)
61s Inside of pressure drive portion
63 Spring
80 Solenoid
83 Drive rod
85 Coil spring (return spring)
110a CS valve seat
150 CS valve
151 CS valve element
611 Pressure sensitive body
831 Drive rod
Pc Control pressure
Pd Discharge pressure
Ps Suction pressure
V Capacity control valve

The invention claimed is:
1. A capacity control valve comprising:
a valve housing provided with a suction fluid supply chamber to which a suction fluid of suction pressure is supplied, and a control fluid supply chamber to which a control fluid of control pressure is supplied;
a CS valve formed by a CS valve element driven in an axial direction by a solenoid, and a CS valve seat provided in a communication passage between the control fluid supply chamber and the suction fluid supply chamber, the CS valve being connectable to and separable from the CS valve seat; and
a pressure drive portion arranged in the control fluid supply chamber in a sealed manner and biasing the CS valve element in an opposite direction to a driving direction of the solenoid, wherein
the control fluid is introduced on a first side of the pressure drive portion, and the suction fluid is introduced on a second side of the pressure drive portion, the first side and the second side being opposed to each other through the pressure drive portion in the axial direction;
the capacity control valve further comprises a retaining member that retains the pressure drive portion, and
the retaining member is provided with a supply port communicating with an inside of the pressure drive portion, the supply port being directed in the axial direction.

2. A capacity control valve comprising:
a valve housing provided with a suction fluid supply chamber to which a suction fluid of suction pressure is supplied, and a control fluid supply chamber to which a control fluid of control pressure is supplied;
a CS valve formed by a CS valve element driven in an axial direction by a solenoid, and a CS valve seat provided in a communication passage between the control fluid supply chamber and the suction fluid supply chamber, the CS valve being connectable to and separable from the CS valve seat; and
a pressure drive portion arranged in the control fluid supply chamber in a sealed manner and biasing the CS valve element in an opposite direction to a driving direction of the solenoid, wherein
the control fluid is introduced on a first side of the pressure drive portion, and the suction fluid is introduced on a second side of the pressure drive portion, the first side and the second side being opposed to each other through the pressure drive portion in the axial direction,
the capacity control valve further comprises a return spring that is provided separately from the pressure drive portion and biases the CS valve element in the opposite direction to the driving direction of the solenoid, and
the CS valve element and the pressure drive portion are out of contact upon a non-driving state of the solenoid.

3. The capacity control valve according to claim 2, wherein
the pressure drive portion includes a spring that biases the CS valve element in the opposite direction to the driving direction of the solenoid, and the spring has a spring constant higher than a spring constant of the return spring.

4. The capacity control valve according to claim 2, further comprising a retaining member that retains the pressure drive portion, wherein
the retaining member is provided with a supply port communicating with an inside of the pressure drive portion, the supply port being directed in the axial direction.

5. The capacity control valve according to claim 1, further comprising a return spring that is provided separately from the pressure drive portion and biases the CS valve element in the opposite direction to the driving direction of the solenoid, wherein
the CS valve element and the pressure drive portion are out of contact upon a non-driving state of the solenoid.

6. The capacity control valve according to claim 5, wherein
the pressure drive portion includes a spring that biases the CS valve element in the opposite direction to the driving direction of the solenoid, and the spring has a spring constant higher than a spring constant of the return spring.

7. The capacity control valve according to claim 1, wherein an effective pressure receiving area of the pressure drive portion is larger than an area of a valve opening of the CS valve seat.

8. The capacity control valve according to claim 2, wherein an effective pressure receiving area of the pressure drive portion is larger than an area of a valve opening of the CS valve seat.

* * * * *